(No Model.) 2 Sheets—Sheet 1.
C. A. ROUVEYRE.
VELOCIPEDE.
No. 444,620. Patented Jan. 13, 1891.
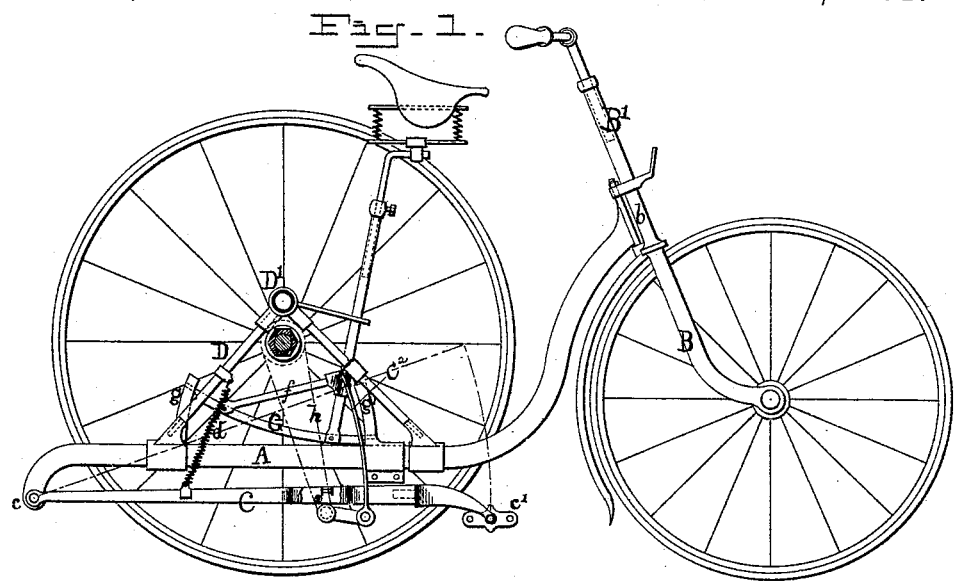
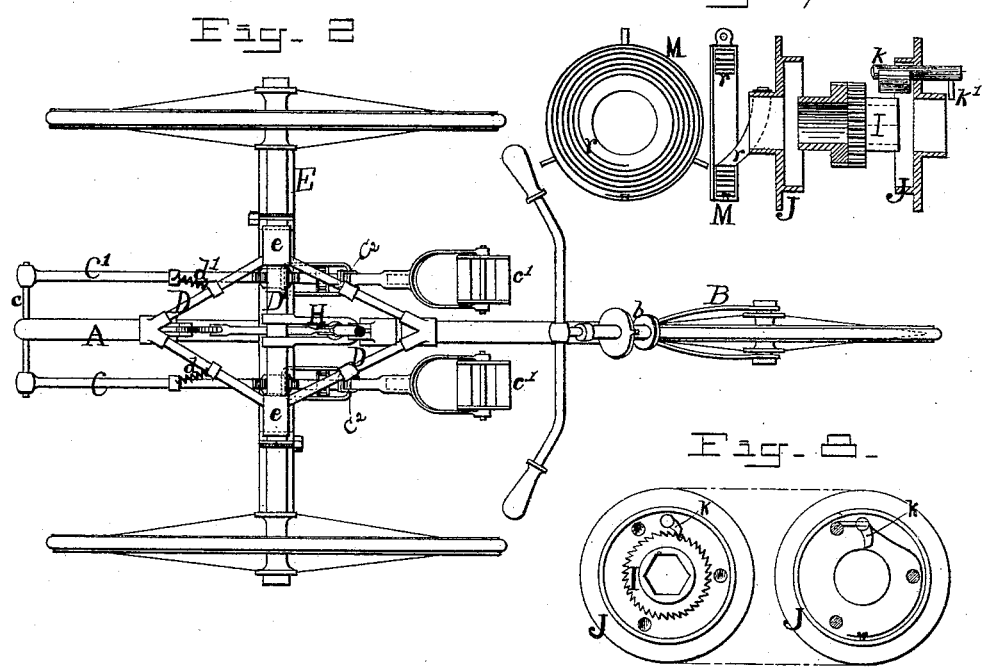
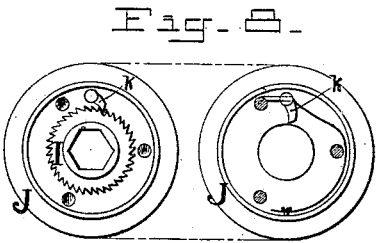
WITNESSES:
John Revell
George Baumann
INVENTOR
Camille Aimé Rouveyre
BY
Howson and Howson
his ATTORNEYS (No Model.) 2 Sheets—Sheet 2.
C. A. ROUVEYRE.
VELOCIPEDE.
No. 444,620. Patented Jan. 13, 1891.
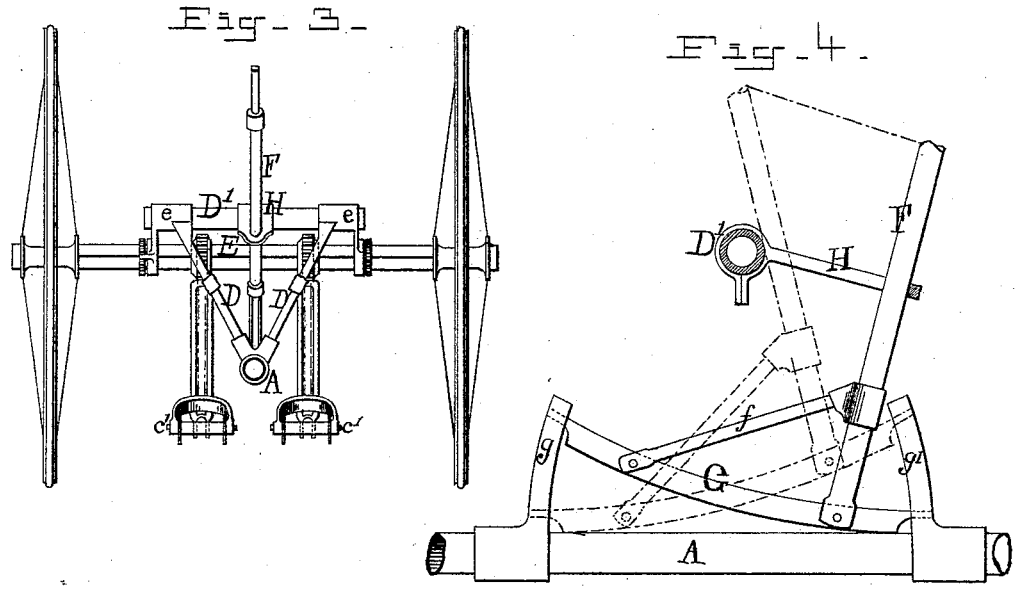
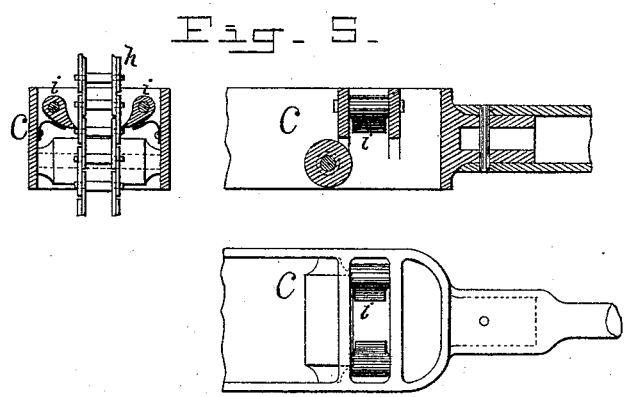
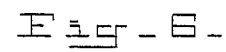
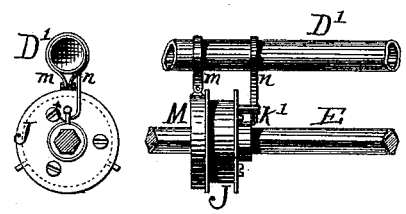
WITNESSES:
John Revell
George Baumann
INVENTOR
Camille Aimé Rouveyre
BY
Howson and Howson
his ATTORNEYS
THE NORRIS PETERS CO., PHOTO-LITHO., WASHINGTON, D. C.

UNITED STATES PATENT OFFICE.

CAMILLE AIMÉ ROUVEYRE, OF PARIS, FRANCE.

VELOCIPEDE.

SPECIFICATION forming part of Letters Patent No. 444,620, dated January 13, 1891.

Application filed March 4, 1890. Serial No. 342,680. (No model.) Patented in France November 17, 1888, No. 192,695.

*To all whom it may concern:*

Be it known that I, CAMILLE AIMÉ ROUVEYRE, mechanician, of Paris, (Seine,) in the Republic of France, have invented a System of Mechanism for Driving or Propelling Vehicles, (for which I have obtained Letters Patent in France, No. 192,695, dated November 17, 1888,) of which the following is a specification.

This invention relates to a system of mechanism for driving or propelling vehicles which is based mainly on certain novel combinations hereinafter set forth, namely: first, substituting in place of the movement usually applied to the cranks for driving the wheels of vehicles of all descriptions—bicycles, tricycles, and the like—jointed or vibrating levers, by means of which the displacement of the weight of the rider is utilized as a motive power; second, the arrangement of the support of the seat, rendered independent of the said levers, so that the maximum weight of the body always acts uniformly, notwithstanding its displacement on the arms of the levers, which are maintained equal in all positions; third, a system of transmission or driving gear admitting of modifications in its arrangement, but which in all cases obviates dead-points in the transmission of movement to the driving-wheels of the vehicle; fourth, the general construction and combination of the parts as a wheel enabling the motive power to be utilized to the best advantage.

In order that my said invention may be fully understood, I shall now proceed more particularly to describe the same, and for that purpose shall refer to the several figures on the annexed sheet of drawings, the same letters of reference indicating corresponding parts in all the figures.

Figure 1 of the accompanying drawings represents in longitudinal elevation an example of a tricycle the parts of which are arranged according to the aforesaid novel mechanical combinations herein specified. Fig. 2 represents the tricycle in plan. Fig. 3 is an end elevation partly in section. Fig. 4 illustrates the lever mechanism drawn to a scale twice as large as the preceding figures. Fig. 5, drawn to a still larger scale, illustrates details of the ratchet-motion worked by the levers. Fig. 6 illustrates in side and end views a modification of the ratchet-motion, details of which are shown in Figs. 7 and 8.

This vehicle is in the example illustrated constructed with a backbone A, formed by a hollow steel tube bent up at the forward end, where it is provided with a head $b$ for the fork B of the steering-wheel and the steering-handle bar B'. At the rear end of this backbone two levers C C', which are completely independent of one another, are centered, being attached to pins or pivots $c$, Figs. 1 and 2, and work in guides $c^2$, carried by the frame, Figs. 1, 2, and 3. Each lever is connected by a spring (marked $d$ and $d'$ respectively) to the bars D, inclined upward and outward, which are united to a hollow bar or tube D', which completes the frame-work of the tricycle by connecting the backbone A by sleeves or collars $e$ to the axle E of the driving-wheels. The springs $d$ and $d'$, being attached to fixed points, simply serve to draw up the levers—that is to say, to pull them back to their original position after they have been depressed by the weight of the person seated on the seat or saddle, and whose feet rest upon pedals $c'$, carried in forks at the ends of the levers C and C'.

The bar F, which carries the seat, is connected at its lower extremity to a quadrant or rocker G by means of a double articulation or connection and a stay $f$, as indicated in the drawings, and the two extremities of this rocker work in two guides $g$ $g'$, attached to the backbone. A slotted bar H, attached to the tubular piece D', supports the bar F laterally, the said bar in the forward position being inclined as indicated in full lines in Fig. 4, and at the end of the backward stroke being inclined in the position indicated by the dotted lines in the same figure and resting against the tube D'. The object of this mode of connecting the bar F, which acts as a support for the seat, and consequently for the rider seated thereon, is to enable the rider by simple rocking motion to move himself from the front to the back by pressing with all his weight on the pedals of the levers C and C'. Now, as may be readily understood by referring to the dotted lines in Fig. 4, this movement is not effected by causing the seat to describe an arc of a circle about a fixed point as a center, but on a triple joint or articulation obtained by the displacement of the quadrant G and the attachments of the stay *f*. It results from this arrangement that the length of the lever-arms remains practically the same in all positions and that the force exerted, although proportioned to the eccentric travel of the seat, likewise remains the same at each degree traversed. It is simply necessary to press upon the pedals, the legs being stretched out, and to rock the body forward and backward alternately in order to depress the levers, which are elevated by the action of the springs *d d'* when the pressure is removed.

In order to convert this alternate upward and downward motion into a continuous rotary motion of the driving-axle without a dead-point, I employ two toothed wheels fixed on the axle E and two pitch-chains *p*, each being driven separately by a double ratchet-motion inclosed in each of the levers C C'. Fig. 5 represents this mechanism in longitudinal and transverse section and in plan. Two spring-pawls *i* in a species of rectangular box forged with the lever act externally on opposite sides of the chain, engaging with the projecting ends of the link-pins, so as to pull down the chain when the lever descends and slip over it when the lever rises. The rider may press down both levers at once, or he may depress them alternately by raising one foot and pressing down with the other, as in the act of walking, and in either case the chain is always driven without any dead-point such as occurs in transmitting motion by means of cranks. While retaining this system of direct transmission by levers and chains and without cranks, the construction of the ratchet-motion may be modified without changing the principle. Thus, for example, two spring-barrels may be employed, with ratchet wheels or pinions on the driving-axle, being connected to the levers by a flexible metal band or by chains. This modified arrangement is illustrated in Figs. 6 to 8, and consists for each lever of a drum J, free to turn upon the boss of a ratchet-wheel I, keyed upon the axle E. To this drum is attached one end of the chain or flexible band or connection, the other extremity of which is fastened to the lever, so that when the latter is depressed the drum is rotated, the same motion being imparted to the axle by the action of the pawl *k*, which engages with the teeth of the ratchet-wheel I. To the boss of the drum is attached one extremity of a spring *r*, the other end of which is connected to a barrel M, connected by a collar *m*, Fig. 6, to the tube D', so as to be incapable of rotating, and the spring is consequently wound up when the drum rotates. When the pressure is removed from the lever, the drum J is driven in a contrary direction by the action of the spring, which in uncoiling causes the drum to rotate, thus maintaining the tension of the chain or band and causing it to be wound up or drawn back to its original position relatively to the drum. By making the spring *r* in the barrel sufficiently powerful the two helical springs *d d'*, Fig. 1, attached to the levers, can be dispensed with, the latter being raised, as hereinbefore described, directly the pressure of the foot on the pedal is removed.

In order that the pawl *k* may not prevent the backing of the vehicle by remaining engaged with the ratchet-teeth I, its pin or axis is prolonged, so as to project outside the drum J, and is provided with an arm *k'*, which when the said drum has returned to its original position comes in contact with a stop *n*, Fig. 6, fixed on the tube D'.

The combinations of mechanism hereinbefore described constitute an apparatus acting under novel and peculiar conditions, and the construction of the several parts may evidently be modified according to the circumstances or conditions under which they are employed—such, for example, as the different constructions of vehicles which the mechanism is employed to drive—without affecting the principle of the invention.

I claim—

1. A bicycle, tricycle, or the like provided with driving mechanism operated through the feet of the rider, and a rocking seat for the latter independent of the said driving mechanism, whereby motion may be transmitted from the rocking seat to the driving mechanism through the body of the rider, all substantially as set forth.

2. A wheeled vehicle provided with treadle-driving levers and a rocking seat for the rider independent of the said levers, whereby motion may be transmitted from the rocking seat to the said levers through the body of the rider, all substantially as set forth.

3. A wheeled vehicle having treadle-levers, mechanism to impart a rotary motion to the wheels from the treadle-levers, and a rocking seat for the rider independent of the said levers, whereby motion may be transmitted from the rocking seat to the levers through the body of the rider, all substantially as described.

4. A wheeled vehicle having treadles, pawl-and-ratchet mechanism between the treadles and driving-wheels to impart a rotary motion to the latter from the treadles, and a rocking seat for the rider independent of the said treadles, whereby motion may be transmitted from the rocking seat to the treadles through the body of the rider, all substantially as described.

5. In a bicycle, tricycle, or the like, the combination of the frame, a support for the seat, a sector to which the support is secured rocking in the frame, and guides for each end of the sector, substantially as and for the purposes set forth.

In testimony whereof I have signed my name to this specification in the presence of two subscribing witnesses.

CAMILLE AIMÉ ROUVEYRE.

Witnesses:
LÉON CROMEKEN,
R. J. PRESTON.